US006186894B1

(12) United States Patent
Mayeroff

(10) Patent No.: US 6,186,894 B1
(45) Date of Patent: Feb. 13, 2001

(54) REEL SLOT MACHINE

(76) Inventor: Jason Mayeroff, 2180 E. Warm Springs Rd., #2025, Las Vegas, NV (US) 89119

( * ) Notice: Under 35 U.S.C. 154(b), the term of this patent shall be extended for 0 days.

(21) Appl. No.: 09/112,225

(22) Filed: Jul. 8, 1998

(51) Int. Cl.[7] .......... A63F 13/00

(52) U.S. Cl. .......... 463/20; 463/16; 463/21; 273/138.1

(58) Field of Search .......... 463/16–20, 21; 273/138.1, 141 R, 142 R

(56) References Cited

U.S. PATENT DOCUMENTS

| | | | | |
|---|---|---|---|---|
| 4,448,419 | | 5/1984 | Telnses | 273/143 R |
| 5,423,539 | * | 6/1995 | Nagao | 273/143 R |
| 5,580,053 | * | 12/1996 | Crouch | 463/20 |
| 5,584,763 | * | 12/1996 | Kelly et al. | 463/16 |
| 5,722,891 | * | 3/1998 | Inoue | 463/20 |
| 5,788,573 | * | 8/1998 | Baerlocher et al. | 463/16 |
| 5,823,874 | | 10/1998 | Adams | 463/17 |
| 5,848,932 | * | 12/1998 | Adams | 463/20 |
| 5,947,820 | * | 9/1999 | Morro et al. | 463/9 |
| 6,012,982 | * | 1/2000 | Piechowiak et al. | 463/16 |
| 6,062,980 | * | 5/2000 | Luciano | 463/20 |

OTHER PUBLICATIONS

IGT (Australia) PTY, Limited Brochure, "Games Fit For A King ", 1998, 12 pages.

Bally Gaming Australia Brochure, "Bally Is Back ", no date, 6 pages.

* cited by examiner

*Primary Examiner*—Valencia Martin-Wallace
*Assistant Examiner*—John M. Hotaling II
(74) *Attorney, Agent, or Firm*—John Edward Roethel

(57) ABSTRACT

A slot machine is configured to have a main game comprising a multi-reel payline mechanical reel or video reel slot arrangement with at least one payline and a secondary event game comprising a multi-reel, one or more payline mechanical slot arrangement. Whenever the player achieves a combination of symbols on the main game that awards the player with the secondary event game, the number of chances provided to the player to play the secondary event game is based on the number of paylines that the player has played on the main game or by the number of credits wagered on each payline. Alternatively, the number of spins awarded to the player on the secondary event game can be determined by the symbol combinations achieved by the player on the main game. All spins of the three reel secondary event game can be winning spins or, alternatively, the spins on the secondary event reel game can be either winning or losing spins.

18 Claims, 2 Drawing Sheets

REEL SLOT MACHINE

This invention relates to a mechanical reel or video reel slot machine, and more particularly to a mechanical reel or video reel slot machine that has a main five reel game with five or more paylines and a secondary event three reel game having one or more paylines.

BACKGROUND OF THE INVENTION

Reel slot machines have been used in gaming establishments for more than one hundred years. The traditional reel slot machine has three mechanical reels that rotate around a common horizontal axis. A reel strip is attached around the circumference of each slot reel and the reel strip contains a plurality of symbols thereon. As each reel comes to a stop, a symbol on the perimeter of the reel strip is displayed on a horizontal pay line on the face of the gaming machine. If the symbols that align on the payline match one of the preselected winning combinations, the player is a winner.

From the traditional three reel, single payline slot machine, newer slot machine concepts have evolved. Slot machines have been developed that have multiple paylines—such as additional horizontal paylines, diagonal paylines and even V-shaped paylines. The number of reels have been increased beyond the basic three reel slot machines; four reels, five reels and more have been used up to the classic Big Bertha slot machine that has ten reels.

Besides using mechanical reels, slot machines have been developed that use video representations of spinning reels. However, video reel slot machines have not been as successful as the mechanical spinning reel slot machines because the players feel that their chances of winning are lower on video slot machines. On a mechanical spinning reel slot machine, a player has a feel for the number of symbols that are located on the reel strip which is mounted around the circumference of the spinning wheel and therefore the player perceives that he knows the odds of each symbol appearing on a payline. In a video slot machine, the player has no way of perceiving how may symbols are possible to appear in each window behind the payline. Therefore, the player perception is that he is receiving a better opportunity of winning on a mechanical spinning reel slot machine.

One of the more popular video reel slot machines in the world that has been created is a five reel, nine payline slot machine. These slot machines are known as "Australian" style slot machines since their genesis appears to have been in Australia. When the video representation of the reels stop spinning, fifteen symbols are displayed to the player disposed in three horizontal rows and five vertical columns. On this three-by-five matrix formed by the three rows and five columns of symbols that are shown, nine separate paylines are provided.

Payline #1 is the center horizontal row as shown:

| | | | | |
|---|---|---|---|---|
| | | | | |
| X | X | X | X | X |
| | | | | |

Payline #2 is the top horizontal row as shown:

| | | | | |
|---|---|---|---|---|
| X | X | X | X | X |
| | | | | |
| | | | | |

-continued

Payline #3 is the bottom horizontal row as shown:

| | | | | |
|---|---|---|---|---|
| | | | | |
| | | | | |
| X | X | X | X | X |

Payline #4 is the V-shaped configuration as shown:

| | | | | |
|---|---|---|---|---|
| X | | | | X |
| | X | | X | |
| | | X | | |

Payline #5 is an inverted V-shaped configuration as shown:

| | | | | |
|---|---|---|---|---|
| | | X | | |
| | X | | X | |
| X | | | | X |

Payline #6 is a W-shaped configuration as shown:

| | | | | |
|---|---|---|---|---|
| X | | X | | X |
| | X | | X | |
| | | | | |

Payline #7 is an inverted W-shaped configuration as shown:

| | | | | |
|---|---|---|---|---|
| | | | | |
| | X | | X | |
| X | | X | | X |

Payline #8 is another inverted W-shaped configuration as shown:

| | | | | |
|---|---|---|---|---|
| | X | | X | |
| X | | X | | X |
| | | | | |

Payline #9 is another W-shaped configuration as shown:

| | | | | |
|---|---|---|---|---|
| | | | | |
| X | | X | | X |
| | X | | X | |

These nine payline configurations are merely representative of any of a myriad of payline configurations that can be used, and the number of paylines can be more or less than nine paylines.

Each coin, token or credit wagered by the player activates in sequential order the paylines. The player must wager nine coins to activate all nine paylines with one coin on each line. A maximum of five credits is usually allowed (although other gaming machines of this type can have a maximum number of credits less than five or more than five up to as many as twenty per payline) on each payline so the maximum wager by the player would be forty-five credits.

For example, there is in use in Australia a video reel slot machine that has twenty paylines and allows up to twenty coins, tokens or credits to be wagered on each payline.

A plethora of winning symbol combinations are provided so that the player has a large number of various opportunities to win depending on which symbols are displayed in which locations on the reels when the reels stop spinning.

In order to improve the player appeal of mechanical spinning reel slot machines, a recent development has been what are known as secondary event slot machines. In secondary event gaming machines, the player first plays a main game. If a preselected event occurs during the play of the main game, the player is provided with a secondary event which allows the player an opportunity to win a bonus payout.

One of the first secondary event games that was created for the slot machine market is a game known as the "WHEEL OF FORTUNE" based on the television game show of the same name. When the third reel of the slot machine displayed a "Spin" symbol on the payline, the secondary event was represented by a replica spinning wheel. The player would press a special "Spin" button on the button panel of the gaming to activate the replica spinning wheel to rotate. When the replica spinning wheel came to rest after a few seconds, the player would win the amount shown in the arcuate segment demarcated by an indicator. The winning segment was randomly determined by the electronics of the game. The player could win as many as one thousand coins during this secondary event phase of the game.

The popularity of "WHEEL OF FORTUNE" spawned other secondary event games. Currently a very popular secondary event game is the video reel slot machine known as "REEL EM IN" which is an Australian style five reel, nine payline video slot machine that provides the player with a secondary event if certain preselected winning combinations are achieved on the paylines. In this game, which has a fishing theme, if the player achieves a secondary event opportunity, the first video screen display is replaced by a second video screen display which shows five fisherman sitting in boats. The player selects a fisherman and video animation shows the fisherman reeling in a fish. The size of the fish caught determines the multiplier applied to the amount of the player's wager which is how the secondary event payout is determined.

The "REEL EM IN" game has the drawback of being entirely a video reel slot machine. In a video reel slot machine, a player cannot physically analyze the size of the reel strip and the player cannot physically estimate the number of symbols on each reel strip. Therefore, many reel slot machine players are uncomfortable playing video reel slot machines since the player has absolutely no feel for the odds on this type of machine.

Also none of the current secondary event games that are available offer the player more than one opportunity in the secondary event phase of the game. Whenever a player achieves a secondary event, the player is provided with only one chance at the secondary event.

It is an object of the present invention to provide a gaming slot machine in which the main game has multi-reels and one or more paylines and the secondary event game is a mechanical slot arrangement with one or more reels and one or more paylines and the player is provided with multiple chances at the secondary event.

It is a feature of the present invention to provide, in the preferred embodiment, a slot machine with five mechanical or video reels and nine paylines which also includes a secondary event feature. The secondary event feature, in the preferred embodiment, is a three reel, single payline mechanical slot arrangement in which each spin is a winning spin. The player is also given multiple chances at the secondary event with the number of chances based on the number of paylines that have been activated by the player prior to the spin of the reels in the main game.

It is an advantage of the present invention that the player will be encouraged to play more paylines in the main game since the player will receive multiple chances at the secondary event feature based on the number of paylines played by the player.

Other objects, features and advantages of the present invention will become apparent from a consideration of the following detailed description.

SUMMARY OF THE INVENTION

A slot machine is configured to have a main game comprising a multi-reel payline mechanical reel or video reel slot arrangement with at least one payline and a secondary event game comprising a one or more reel, one or more payline mechanical slot arrangement. Whenever the player achieves a combination of symbols on the main game that awards the player with the secondary event game, the number of chances provided to the player to play the secondary event game is based on the number of paylines that the player has played on the main game or by the number of credits wagered on each payline. Alternatively, the number of spins awarded to the player on the secondary event game can be determined by the symbol combinations achieved by the player on the main game. All spins of the three reel secondary event game can be winning spins or, alternatively, the spins on the secondary event reel game can be either winning or losing spins.

DETAILED DESCRIPTION OF THE PREFERRED EMBODIMENTS

The present invention comprises a gaming machine having a first set of either mechanical reels or video reels that are used as the main game played by the player and a second set of mechanical slot reels that are used as the secondary event game played by the player.

Figure 1:
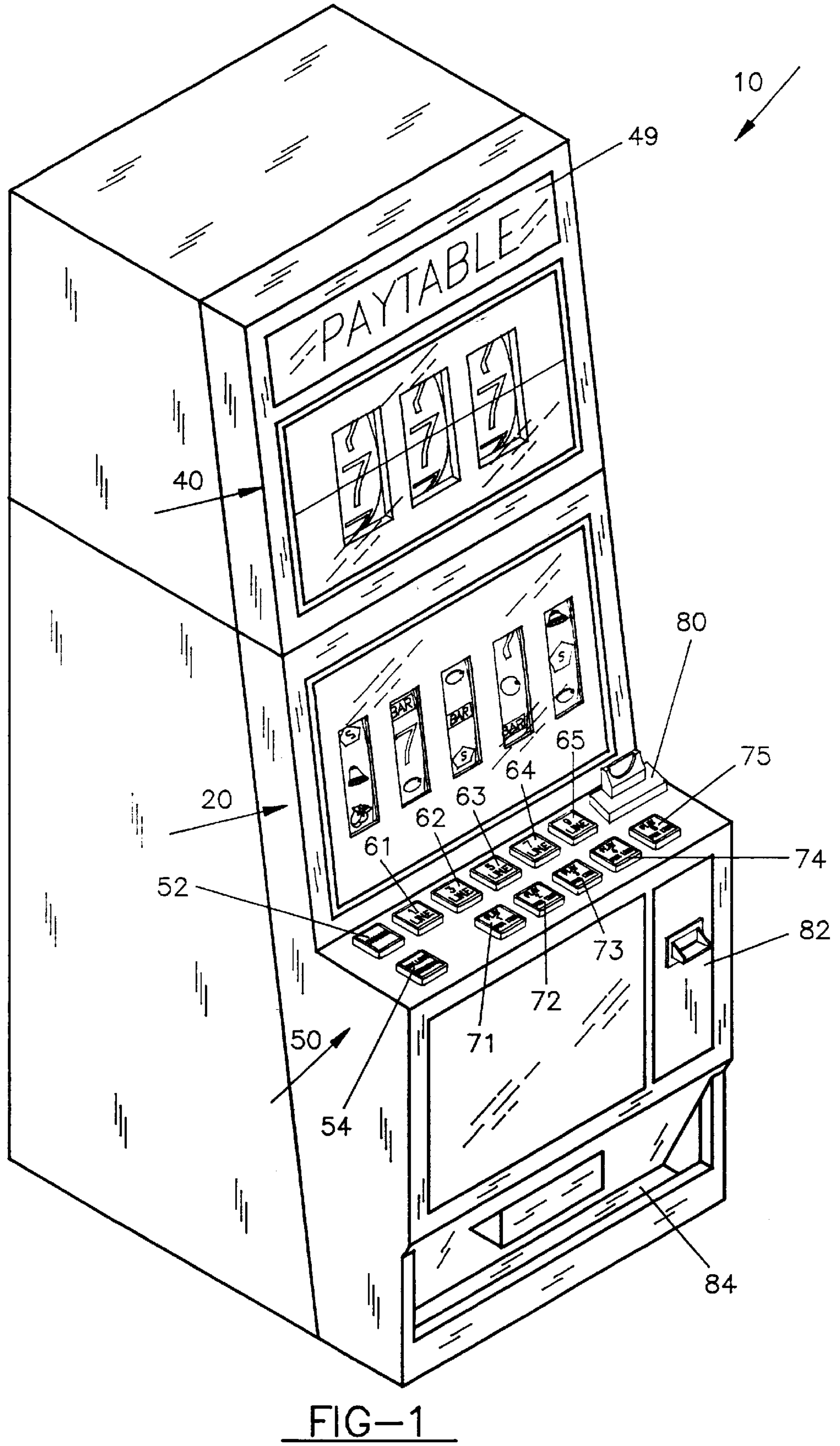
FIG. 1 shows an isometric view of a slot machine of the present invention.
Figure 2:
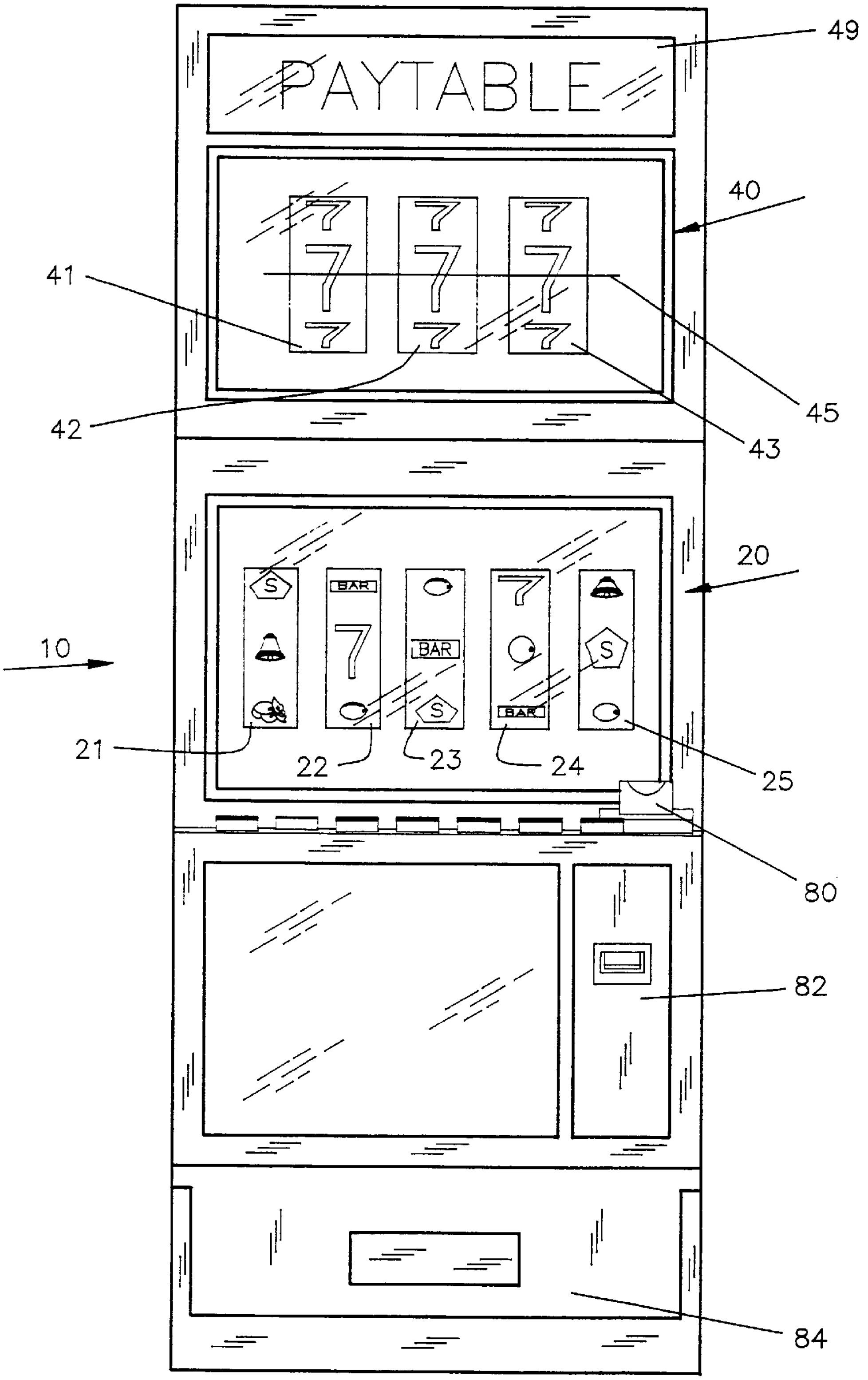
FIG. 2 shows a front view of the slot machine of the present invention.

FIGS. 1 and 2 show the gaming machine generally at 10. The gaming machine 10 is a conventional cabinet configuration with a first set of slot reels 20 which are preferably located in generally the center section of the gaming machine cabinet. A second set of slot reels 40 are located in generally the upper section of the gaming machine cabinet. Also, at the top section of the gaming machine cabinet 10 there is provided a pay table 49 which shows the various winning combinations that the player is attempting to achieve both on the main game and on the secondary event game.

Additional components of the gaming machine 10 are such conventional items as a button panel 50 upon which are located the buttons used by the player to operate the gaming machine, such as a "Cash Out" button 52, and a "Spin" button 54.

Also mounted on the button panel 50 are the buttons used by the player to select which paylines are to be active in the main game and the number of credits that are to be wagered on each active payline. In the preferred embodiment of the present invention, there are provided, on the same row as the "Cash Out" button 52, five payline selection buttons that are used to select the active paylines: the "One Payline" button 61, the "Three Payline" button 62, the "Five Payline" button 63, the "Seven Payline" button 64, and the "Nine Payline" button 65. Thus, in this configuration, the player can select to have active from among one, three, five, seven or nine paylines. Other payline selection configurations can be used to allow the player to select other combinations or any or all of the paylines to be active.

Again, in the preferred embodiment of the present invention, just below the payline selection buttons on the button panel 50, there are provided five wager selection buttons to allow the player to select the number of credits to be wagered on each payline: the "Bet One" button 71, the "Bet Two" button 72, the "Bet Three" button 73, the "Bet Four" button 74, and the "Bet Five" button 75. Thus, in this configuration, the player can select from between one and five credits to be wagered on each active payline. Other wager selection configurations can be used to allow the player to select the number of credits to be wagered on each active payline.

Other conventional components are the coin head 80, the bill acceptor 82 and the payout tray 84. The interior of the gaming machine 10 contains the electronic controls that are used to operate the gaming machine which are also conventional.

In one of the preferred embodiments of the present invention, the main slot reels 20 comprise a five reel configuration with each of the reels 21, 22, 23, 24 and 25 located adjacent to each other and mounted to spin horizontally around a common axis. Each reel has mounted around its circumference a reel strip which contains various symbols that are visible to the player as the reel spins. When the reels stop spinning, three rows of symbols are visible to the player resulting in a three-by-five matrix of symbols being displayed.

In another preferred embodiment of the present invention, the main slot reels 20 could be a video display representation of spinning slot reels using the conventional technology that is used in video reel slot machines. This video reel representation would display a five reel configuration with each reel 21, 22, 23, 24 and 25 displayed adjacent to each other on a video display screen. Each reel would appear to spin around a horizontal axis and each reel appears to have a reel strip which contains various symbols that are visible to the player as the reel spins. When the reels stop spinning, three rows of symbols are displayed to the player on a video screen resulting in a three-by-five matrix of symbols being displayed.

In accordance with the preferred embodiment of the present invention, nine paylines are provided. Any suitable combination of symbol positions can be utilized as paylines; however, in the preferred embodiment of the present invention, the nine paylines that are used in "Australian" style slot machines as described above are used since players have become familiar with this type of nine line payline configuration. Alternatively, other multi-reel mechanical or video reel configurations having one or more paylines can be used for the main game slot reels 20.

The secondary event slot reel 40 has one or more mechanical reels and is preferably a three reel, single payline arrangement. Each of the three reels 41, 42 and 43 are positioned adjacent one another for rotation around a common horizontal axis. The single payline 45 is the center line of the three rows of symbols that are visible to the player. Alternatively, other one or more reel, one or more payline mechanical reel configurations can be used for the secondary event slot reel 40.

The method of the present invention as practiced on the gaming machine 10 of the present invention is as follows:

A player inserts coins into the coin head 80 or paper currency into the bill acceptor 82. The amount inserted is accrued on a credit meter (not shown) which is conventional and which shows the number of accrued credits that the player has available to wager when playing the gaming machine. By pressing one of the payline selection buttons 61, 62, 63, 64 or 65, the player selects the number of paylines to be active during that play of the game. The player then selects one of the wager selection buttons 71, 72, 73, 74 or 75 to determine the number of credits to be wagered on each of the paylines that the player has activated for the upcoming spin of the reels.

Once the player has completed his wagering, the "Spin" button 54 (or alternatively a conventional pull handle) is activated and all five reels 21, 22, 23, 24 and 25 of the main game 20 commence to spin. Each reel eventually comes to a stop and symbols are displayed in each of the locations of the three-by-five matrix displayed to the player. Certain symbol combinations have been preselected as winning combinations and are shown to the player in the pay table 49. If the player achieves a winning combination of symbols on any of the paylines, then the player wins. Any suitable pay table 49 can be used. An example of a representative pay table is shown in Table 1.

TABLE 1

| WINNING COMBINATIONS | | | | | PAYOUT |
|---|---|---|---|---|---|
| A | A | A | A | A | 5000 |
| A | A | A | A | XX | 2000 |
| A | A | A | XX | — | 150 |
| A | A | XX | — | — | 10 |
| B | B | B | B | B | 500 |
| B | B | B | B | XX | 75 |
| B | B | B | XX | — | 10 |
| B | B | XX | — | — | 2 |
| C | C | C | C | C | 500 |
| C | C | C | C | XX | 75 |
| C | C | C | XX | — | 10 |
| C | C | XX | — | — | 2 |
| D | D | D | D | D | 200 |
| D | D | D | D | XX | 50 |
| D | D | D | XX | — | 5 |
| E | E | E | E | E | 100 |
| E | E | E | E | XX | 25 |
| E | E | E | XX | — | 5 |
| F | F | F | F | F | 100 |
| F | F | F | F | XX | 25 |
| F | F | F | XX | — | 5 |
| G | G | G | G | G | 100 |
| G | G | G | G | XX | 25 |
| G | G | G | XX | — | 2 |
| H | II | H | H | H | 100 |
| H | H | H | H | XX | 15 |
| H | H | H | XX | — | 2 |
| I | I | I | I | I | 100 |
| I | i | I | I | XX | 10 |
| I | I | J | XX | — | 2 |

With regard to Table 1, the letters A, B, C, D, E, F, G, H and I represent suitable symbols that can be used on the reel strips 21, 22, 23, 24 and 25. For example, the conventional fruit symbols could be used or, alternatively, a group of symbols representing a common theme could be used. The letters XX represent any symbol except the associated letter symbol in that line. The mark "--" represents any symbol including the associated letter symbol in that line.

If the player achieves any of the symbol combinations shown in Table 1 on any active payline, then the player is paid the payout amount for that symbol combination shown in the pay table multiplied by the number of credits wagered on that active payline. The payout is typically made by accruing credits on a credit meter which is provided in any suitable location on the gaming machine. The player then uses the credits accrued on the credit meter to make additional wagers on the gaming machine. Alternatively, any amounts won by the player can be paid from a coin hopper mounted on the interior of the gaming machine directly into the payout tray 84. When the player has completed his play of the gaming machine, the player collects his accrued credits by pressing the "Cash Out" button 52 and the coin hopper then dispenses coins into the payout tray 84 to pay the player. Alternatively, other conventional payout mechanisms, such as a ticket printer, can be used.

Additionally, there is provided another pay table which shows the winning symbol combinations on the main game that earn the player an opportunity to play the secondary event feature of the game which, in the present invention, is the secondary event reel slot machine 40. The winning symbols that must be displayed on the main slot reels 21, 22, 23, 24 and 25 in order to earn the player the opportunity to play the secondary event can be any suitable symbol combination which has been preselected. Table 2 shows a representative pay table that shows the winning symbols that earn the player the opportunity to play the secondary event:

TABLE 2

| WINNING COMBINATIONS | | | | | PAYOUT |
|---|---|---|---|---|---|
| BS | XX | BS | XX | BS | SPIN |
| BS | XX | BS | XX | XX | SPIN |
| BS | XX | XX | XX | BS | SPIN |
| XX | XX | BS | XX | BS | SPIN |

With regard to Table 2 the letters BS represent a suitable bonus symbol that can be used on the reel strips 21, 22, 23, 24 and 25 and indicate to the player that this symbol relates to the secondary event feature. The letters XX represent any symbol but the associated letter symbol in that line.

In the preferred embodiment of the present invention, if the player achieves one of the winning combinations shown in Table 2 and earns the opportunity to play the secondary event feature, the number of plays on the secondary event feature is equal to the number of paylines that the player has activated on the main reels 20. For example, if the player has played all nine paylines on the main reels 20 and achieves a winning combination shown in Table 2, then the player will win nine spins on the secondary event reels 40.

Alternatively, the number of spins on the secondary event game can be determined by the number of credits wagered by the player on the paylines. For example, if the player has wagered five credits on each payline, the player would win five spins on the secondary event reels 40.

Another alternative variation that can be used has the number of spins on the secondary event game determined by the symbol combination achieved on the reels of the main game. In this variation of the present invention, the player would always be awarded at least two spins on the secondary event game for a winning combination on the main game. For example, if the player would achieve three cherries on an active payline, the number of bonus spins on the secondary reel could be three spins; three oranges could yield five spins; and three 7's could yield ten spins. Any suitable symbol combinations could be used as well as any suitable number of bonus spins on the secondary event reels.

In the preferred embodiment of the present invention, the secondary event feature is a three reel mechanical slot machine 40 with a single payline 45. Any suitable symbols can be used on the reel strips 41, 42 and 43 of the secondary event reels 40. Preferably, each symbol on the reel strips 41, 42 and 43 is a "7" with some of the symbols being "Red 7's", some being "White 7's" and some being "Green 7's".

Since all of the symbols on the reels strips 41, 42 and 43 are "7's", each spin of the secondary event reels 40 will result in the player achieving three 7's on the payline 45. Therefore, each spin of the secondary event reels 40 will be a winning spin.

Any suitable pay table can be used for the payouts on the secondary event reels 40. A preferred pay table is shown in Table 3:

TABLE 3

| WINNING COMBINATIONS | | | PAYOUT |
|---|---|---|---|
| RED 7 | RED 7 | RED 7 | 100 |
| WHITE 7 | WHITE 7 | WHITE 7 | 20 |
| GREEN 7 | GREEN 7 | GREEN 7 | 10 |
| ANY 7 | ANY 7 | ANY 7 | 8 |

Therefore, the player will win a minimum of eight credits and a maximum of one hundred credits on each spin of the secondary event reels 40. The number of spins awarded to the player during this bonus feature is the number of paylines that the player had active on the main reels 20 when the player won the bonus spins. If the player had activated all nine lines on the main reels 20 when the player won the opportunity to go to the secondary event reels 40, the player would win nine spins on the secondary event reels 40 and would win no less than seventy-two credits and could possible win nine hundred credits.

One variation that can be made to the present invention is to include a "Mystery Multiplier" feature as part of the secondary event game. A suitable display can be added to the gaming machine, e.g. an LED or similar display board that will display multiplier numbers. At randomly selected times during the play of the secondary event game, a number is randomly selected and that number is used as a multiplier for any winning combinations achieved by the player during the spins occurring during the secondary event game.

In the preferred embodiment, the multiplier number is an integer selected from the group of integers 2, 3, 4, 5, 6 and 10. The probability of any particular integer being the selected integer is weighted so that the overall average mystery multiplier is three times the winning amount. Alternatively any suitable group of multiplier integers can be used and the probability can be weighted to be any suitable average multiplier amount.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A method of playing a gaming machine having a main slot machine with multiple reels and multiple paylines and a secondary event slot machine with at least one mechanical reel and at least one payline, each reel having a plurality of symbols thereon, comprising:

a) making a wager of at least one credit on at least one of the paylines on the main slot machine;

b) activating the main slot machine to cause the reels to spin;

c) when the reels stop spinning, determining which symbols appear on the paylines upon which a wager has been made;

d) awarding a payout if one or more of preselected winning combinations appear on any of the paylines on which a wager has been made;

e) determining a number of spins on the secondary event slot machine by the number of paylines activated on the main slot machine and awarding the determined number of spins on the secondary event slot machine if a preselected secondary event bonus combination is achieved;

f) determining which symbol combination appears on any payline of the secondary event slot machine; and g) awarding a payout on each bonus spin in which a winning symbol combination is achieved on a payline of the secondary event slot machine.

2. The method of claim 1 in which the main slot machine is provided with five reels and nine paylines and the secondary event slot machine is provided with three reels and one payline.

3. The method of claim 1 in which each spin of the secondary event slot machine is a winning spin.

4. The method of claim 1 in which a multiplier number is randomly selected at randomly determined intervals during the play of the secondary event slot machine and the multiplier number is used to increase the amount of payouts achieved during the play of the secondary event slot machine.

5. A method of playing a gaming machine having a main slot machine with multiple reels and at least one payline and a secondary event slot machine with at least one mechanical reel and at least one payline, each reel having a plurality of symbols thereon, comprising:

a) making a wager of at least one credit on at least one of the paylines on the main slot machine;

b) activating the main slot machine to cause the reels to spin;

c) when the reels stop spinning, determining which symbols appear on the paylines upon which a wager has been made;

d) awarding a payout if one or more of preselected winning combinations appear on any of the paylines on which a wager has been made;

e) determining a number of spins on the secondary event slot machine by the number of credits wagered on a payline and awarding the determined number of spins on the secondary event slot machine if a preselected secondary event bonus combination is achieved;

f) determining which symbol combination appears on any payline of the secondary event slot machine; and g) awarding a payout on each spin in which a winning symbol combination is achieved on a payline of the secondary event slot machine.

6. The method of claim 5 in which the main slot machine is provided with five reels and nine paylines and the secondary event slot machine is provided with three reels and one payline.

7. The method of claim 5 in which each spin of the secondary event slot machine is a winning spin.

8. The method of claim 5 in which a multiplier number is randomly selected at randomly determined intervals during the play of the secondary event slot machine and the multiplier number is used to increase the amount of payouts achieved during the play of the secondary event slot machine.

9. A method of playing a gaming machine having a main slot machine with multiple reels and at least one payline and a secondary event slot machine with at least one mechanical reel and at least one payline, each reel having a plurality of symbols thereon, comprising:

a) making a wager of at least one credit on at least one of the paylines on the main slot machine;

b) activating the main slot machine to cause the reels to spin;

c) when the reels stop spinning, determining which symbols appear on the paylines upon which a wager has been made;

d) awarding a payout if one or more of preselected winning combinations appear on any of the paylines on which a wager has been made;

e) determining a number of spins on the secondary event slot machine by which symbol combinations were achieved on the active paylines of the main slot machine, the determined number of spins to be at least two, and awarding the determined number of spins on the secondary event slot machine if a preselected secondary event bonus combination is achieved;

f) determining which symbol combination appears on any payline of the secondary event slot machine; and g) awarding a payout on each spin in which a winning symbol combination is achieved on a payline of the secondary event slot machine.

10. The method of claim 9 in which the main slot machine is provided with five reels and nine paylines and the secondary event slot machine is provided with three reels and one payline.

11. The method of claim 9 in which each spin of the secondary event slot machine is a winning spin.

12. The method of claim 9 in which a multiplier number is randomly selected at randomly determined intervals during the play of the secondary event slot machine and the multiplier number is used to increase the amount of payouts achieved during the play of the secondary event slot machine.

13. A gaming machine having a main slot machine with multiple reels and at least one payline and a secondary event slot machine with at least one mechanical reel and at least one payline, each reel having a plurality of symbols thereon, and including computer controls to operate the gaming machine, comprising:

a) means for wagering at least one credit on at least one of the paylines on the main slot machine;

b) means for activating the main slot machine to cause the reels to spin;

c) means for determining after the reels stop spinning which symbols appear on the paylines upon which a wager has been made;

d) means for awarding a payout if one or more of preselected winning combinations appear on any of the paylines on which a wager has been made;

e) means for awarding a determined number of spins on the secondary event slot machine by the number of paylines activated on the main slot machine if a preselected secondary bonus event is achieved on the main slot machine;

f) means for determining which symbol combination appears on any payline of the secondary event slot machine; and g) means for awarding a payout on each spin in which a winning symbol combination is achieved on a payline of the secondary event slot machine.

14. The gaming machine of claim 13 in which the main slot machine is provided with five reels and nine paylines and the secondary event slot machine is provided with three reels and one payline.

15. The gaming machine of claim 13 further including means for randomly selecting a multiplier number at randomly determined intervals during the play of the secondary event slot machine and means for increasing the amount of payouts achieved during the play of the secondary event slot machine by the amount of the multiplier number.

16. A gaming machine having a main slot machine with multiple reels and at least one payline and a secondary event slot machine with at least one mechanical reel and at least one payline, each reel having a plurality of symbols thereon, and including computer controls to operate the gaming machine, comprising:

a) means for wagering at least one credit on at least one of the paylines on the main slot machine;

b) means for activating the main slot machine to cause the reels to spin;

c) means for determining after the reels stop spinning which symbols appear on the paylines upon which a wager has been made;

d) means for awarding a payout if one or more of preselected winning combinations appear on any of the paylines on which a wager has been made;

e) means for awarding a determined number of spins on the secondary event slot machine by the number of credits wagered on a payline on the main slot machine if a preselected secondary bonus event is achieved on the main slot machine;

f) means for determining which symbol combination appears on any payline of the secondary event slot machine; and g) means for awarding a payout on each spin in which a winning symbol combination is achieved on a payline of the secondary event slot machine.

17. The gaming machine of claim 16 in which the main slot machine is provided with five reels and nine paylines and the secondary event slot machine is provided with three reels and one payline.

18. The gaming machine of claim 16 further including means for randomly selecting a multiplier number at randomly determined intervals during the play of the secondary event slot machine and means for increasing the amount of payouts achieved during the play of the secondary event slot machine by the amount of the multiplier number.

* * * * *